United States Patent [19]
Nola

[11] 3,757,183
[45] Sept. 4, 1973

[54] REDUNDANT SPEED CONTROL FOR BRUSHLESS HALL EFFECT MOTOR
[75] Inventor: Frank J. Nola, Huntsville, Ala.
[73] Assignee: The United States of America as represented by the Administrator of the National Aeronautics and Space Administration, Washington, D.C.
[22] Filed: Mar. 30, 1972
[21] Appl. No.: 239,574

[52] U.S. Cl. ............................. 318/254, 318/328
[51] Int. Cl. ........................................... H02k 29/00
[58] Field of Search .................... 318/326, 327, 328, 318/138, 254

[56] References Cited
UNITED STATES PATENTS
3,383,574   5/1968   Manteuffel .......................... 318/138
3,461,367   8/1969   Takeyasy ............................ 318/138

Primary Examiner—Harold Broome
Assistant Examiner—Thomas Langer
Attorney—L. D. Wofford, Jr. et al.

[57] ABSTRACT

A speed control system for a brushless Hall effect device equipped direct current (D.C.) motor in which separate windings of the motor are powered by separate speed responsive power sources and in which a change in speed, upward or downward, because of the failure of a component of one of the power sources results in a corrective signal being generated in the other power source to supply an appropriate power level and polarity to one winding to cause the motor to be corrected in speed.

6 Claims, 2 Drawing Figures

REDUNDANT SPEED CONTROL FOR BRUSHLESS HALL EFFECT MOTOR

ORIGIN OF THE INVENTION

The invention described herein was made by an employee of the United States and may be manufactured and used by or for the Government of the United States of America for governmental purposes without the payment of any royalties thereon or therefor.

BACKGROUND OF THE INVENTION

This invention relates to systems for the control of the speed of electrical motors and particularly to an improved system for the control of the speed of Hall effect device equipped brushless D.C. motors.

GENERAL DESCRIPTION OF THE PRIOR ART

Conventional direct current motors require commutators to supply currents to motor armature windings in the correct, and periodically reversible, polarities to maintain torque on the armature of the motor. Such commutation is typically provided by means of a wearing contact between a copper commutator and carbon brushes. This arrangement suffers the disadvantages that brushes must be periodically replaced and undesired sparking between brushes and the commutator frequently occurs. In an effort to overcome these disadvantages it has been previously proposed that commutation be achieved by the use of Hall effect devices which under the influence of a permanent magnet rotor cause the direction of motor winding current supplied through them to periodically change in accordance with the torque required of the windings for a particular orientation of the rotor. Such an arrangement is described in Manteuffel et al. U.S. Pat. No. 3,165,685.

The control of the speed of D.C. motors commutated by Hall effect devices has heretofore involved the rather straightforward technique of obtaining a speed responsive signal from a tachometer driven by the motor, comparing the output of the tachometer with a selected reference voltage representative of a desired speed, and then using the difference or error signal to control the power fed to all windings of the motor. While for many applications this system of control is adequate it has been found that where extreme reliability is required that system component failures remain a problem. Such failures can produce either too large or too small control signals, or produce error signals of the wrong polarity, causing the speed of the controlled motor to substantially deviate from a desired speed.

SUMMARY OF THE INVENTION

Accordingly, it is an object of the present invention to provide a motor control system for Hall effect device motors with improved reliability.

The motor speed control system of this invention encompasses separate control and power drive systems, or control channels, for each of two windings of a Hall effect motor. Each control system includes a comparator in which the actual speed signal from a tachometer is compared with a desired speed signal to produce a speed error signal, a bi-directional complementary circuit buffer amplifier for amplifying the resulting speed signal through which the error signal is fed to the Hall effect device providing reverse-current of power for one of the windings, and a reverse-crine shutoff circuit to minimize the effect of a failure of the speed error signal in the reverse current direction.

In the event that there occurs a component failure in one of the control channels such that a zero input or maximum forward speed input is undesirably applied to one of the windings of the motor, the other control channel will provide an appropriate decreased or reversed input to the other winding and cause the speed to be maintained. In the event that there is a circuit failure in one of the control channels which produces a faulty signal which tends to apply an undesired large or maximum reverse current to one of the Hall effect devices and thus an undesired large or maximum reverse torque to the motor, this is sensed by the reverse current shutoff circuit and the faulty signal is reduced to a small insignificant value permitting the other channel to sufficiently compensate to correct or maintain a desired motor speed.

DESCRIPTION OF THE PREFERRED EMBODIMENT

Figure 1:
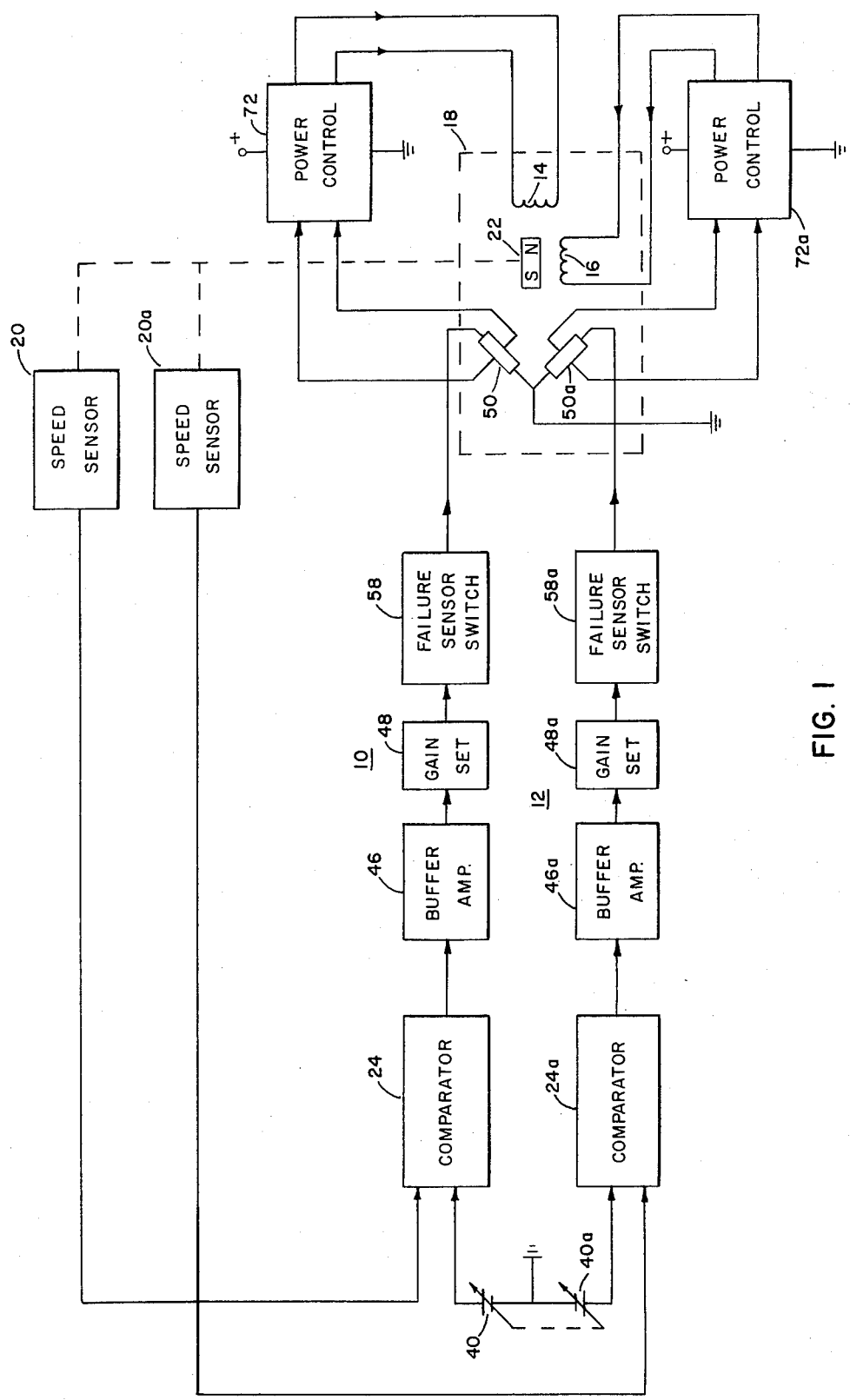
FIG. 1 is an electrical block diagram illustrating the system of the invention.
Figure 2:
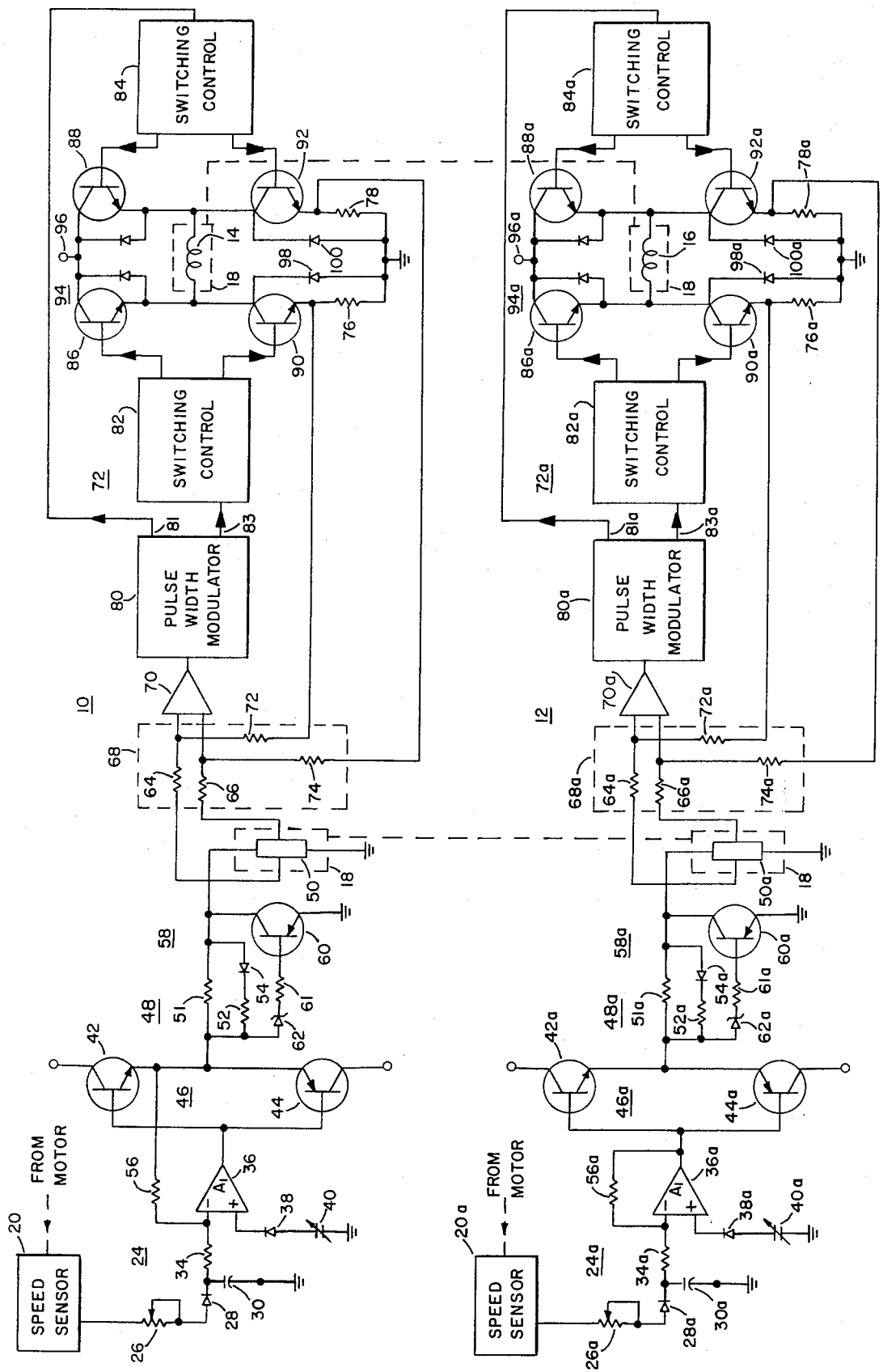
FIG. 2 is an electrical schematic diagram illustrating certain details of the invention.

FIG. 1 illustrates the invention in block form and FIG. 2 provides details of the circuitry employed. Referring to the drawings, this invention encompasses two identical, and redundant, control systems 10 and 12, one supplying power to winding 14 and the other to winding 16 of Hall effect brushless D.C. motor 18. In view of the identity between control systems 10 and 12, only control system 10 will be described in detail. Like circuits and components of the control systems bear like numerals with major functional circuits and components of control system 12 being further identified with the subscript "a."

Speed sensor 20, an A.C. generator, is mechanically coupled to permanent magnet armature or rotor 22 of motor 18 and it provides an A.C. signal output, or speed signal, which varies in amplitude and frequency directly proportional to the speed of rotor 22. This speed signal is fed to comparator 24 where it is adjustable in amplitude by means of potentiometer 26 (FIG. 2) and is fed through rectifier 28 to impress positive half wave pulses on capacitor 30 with respect to common ground 32. Capacitor 30 integrates or smooths the positive pulses and provides a positive D.C. input through resistor 34 to the inverting input of differential amplifier 36. The non-inverting input of differential amplifier 36 is connected through rectifier 38 to a positive terminal of adjustable D.C. reference voltage source 40 which produces a selected voltage, or demand signal, representative of desired motor speed. Rectifier 38, which is identical to rectifier 28, provides an equalizing temperature-sensitive impedance with respect to rectifier 28 to maintain circuit balance despite changes in impedance caused by variations in environmental temperature.

Differential amplifier 36 and the circuitry directly connected to it, making up comparator 24, function to compare the the amplitude of the speed signal and the reference, or demand signal. When the speed signal is less than the demand signal, which will be the case when motor 18 is initially started and until it reaches a desired speed, as represented by the demand signal, the output of differential amplifier 36 and comparator 24 will be positive. In the event that the motor speed exceeds a desired speed, indicated by the speed signal being greater than the demand signal, the output of differential amplifier 36 and comparator 24 will be negative.

The output of comparator 24 (FIG. 2) is fed to the base inputs of PNP and NPN complementary transistors 42 and 44, respectively, making up buffer amplifier 46. These transistors are conventionally connected to a power supply, not shown, which provides plus and minus polarities with respect to common ground 32. The emitter connected output of buffer amplifier 46 is connected through gain setting circuit 48 across a control circuit input of Hall effective device 50 of motor 18. Gain setting circuit 48 consists of resistor 51 in parallel with resistor 52 and diode 54 which are in series. With the diode polarity as shown, and in the event of a negative output on the emitters of transistors 42 and 44 of buffer amplifier 46, the current flow through Hall effect device 50 would be greater than where there is a like value of positive voltage on the emitters of transistors 42 and 44. The purpose of this difference will be explained below.

The output of buffer amplifier 46 is coupled through resistor 56 to the inverting input of differential amplifier 36 to provide a negative feedback path around buffer amplifier 46 and differential amplifier 36 to regulate gain and improve the response of both of these amplifiers. The output of buffer amplifier 46 may be considered as being coupled to Hall effect device 50 through failure sensitive switch 58 which functions to substantially remove any input to Hall effect device 50 in the event that it senses an abnormally high negative, reverse, input to Hall effect device 50. Failure sensitive switch 58 employs transistor 60, the emitter-collector terminals of which are connected across Hall effect device 50 and the base input of which is connected through 7 volt Zener diode 62 to the output of buffer amplifier 46. Zener diode 62 and current limiting resistor 61 causes transistor 60, a PNP type, to be energized only in the event that the output of buffer amplifier 46 should become negative and of a magnitude of at least seven volts, the breakdown voltage of Zener diode 62.

Assume, for example, that the supply voltages to transistors 42 and 44 are both 12 volts, positive and negative, respectively, and that the value of resistors 51 and 52 are of equal value. Thus with transistor 42 "on" and transistor 44 "off" and a positive output voltage from buffer amplifier 46, the resulting current flow to Hall effect device 50 would be half that if the opposite were the case. In other words the same magnitude of current flow to Hall effect device 50 would be obtained with transistor 42 "full on" providing a full 12 volt output as with transistor 44 only half on providing a 6 volt output. Hence, in the reverse torque mode, with a negative output, the control effect or torque gain of the system on motor 18 is substantially greater. Zener diode 62 is then chosen to have a value just in excess of 6 volts or 7 volts. Now if due to a circuit failure a full positive value of 12 volts appears at the output of one of buffer amplifiers 46 or 46a, the other can fully compensate by providing a negative 6 volt output. On the other hand if due to a circuit failure in one of the buffer amplifiers or the preceding circuitry, the output voltage should go to a negative voltage of 12, or between 7 volts and 12 volts and thus there is a voltage on Zener diode 62 in excess of the breakdown voltage of 7 volts, transistor 60 will be turned full on and the voltage across the Hall effect device in circuit with it will be reduced to substantially zero. This will then enable the other channel to provide a small positive compensating output to maintain the speed of motor 18 to the required speed.

The output voltage of Hall effect device 50 is supplied through resistors 64 and 66 of summing circuit 68 to the inputs of differential amplifier 70 of power control 72.

Power control 72 provides a control power input to winding 14 of motor 18 of a magnitude and polarity determined by comparator 24 and the sinusoidal magnetic field applied to Hall effect device 50 by rotor 22 (FIG. 1). The current demand input of differential amplifier 70, fed from Hall effect device 50, is algebraically summed by summing circuit 68 with voltages across resistors 72 and 74 indicative of actual current flow through winding 14 as obtained across resistors 76 and 78 in series with winding 14. The resulting net input to differential amplifier 70 is representative of the difference between the summed inputs. The output of differential amplifier 70 is applied to pulse-width modulator 80 which provides a train of constant amplitude pulses out of output 81 or out of output 83 depending on the polarity of the output of amplifier 70. The pulses vary in width directly with the magnitude of the output of differential amplifier 70. Pulse-width modulator 80 is generally of the type described in U.S. Pat. No. 3,523,228.

The output of pulse-width modulator 80 is applied to switch control 82 or switch control 84 which control switching of transistors 86 and 90 or 88 and 92, respectively, of bridge switching circuit 94 which controls the flow of current from a positive supply terminal 96 through winding 14 to ground in a direction determined by the polarity of output of differential amplifier 70. With a zero input, switch control 82 applies an "on" signal to transistor 90 and an "off" signal to transistor 86 and switch control 84 applies an "on" signal to transistor 92 and an "off" signal to transistor 88. With a positive pulse input, switch control 82 applies an "off signal" to transistor 90 and an "on" signal to transistor 86. Switch control 84 is not operated when switch control 82 is being operated. Thus a positive output from summing amplifier 70 produces a pulse train out of output 83, of pulse-width modulator 80 which operates switch control 82 causing current to flow from left to right through winding 14. Similarly a negative output from summing amplifier 70 produces a pulse train out of output 81 of pulse-width modulator 80 which operates switch control 84 and causes current to flow from right to left in winding 14. By virtue of the periodic reversal of output or commutation by Hall effect devices 50, a continuous torque independent of rotor position is effectively applied in a desired direction to effect rotation of rotor 22. Diodes 98 and 100, connected across the collector-emitter circuits of transistors 90 and 92 permit current flow through winding 14 between pulses when transistors 86 and 88 are both turned off to thus produce an essentially continuous winding current flow from the applied variable width current pulses from the power source. This characteristic is produced by the naturally inductive effect of winding 14. The winding current then is sinusoidal with amplitude and phase controlled by the sinusoidal output of Hall effect device 50. Identical power control 72a functions in the same manner to apply power to winding 16 of motor 18.

OPERATION

In describing the operation of the illustrated system, except where necessary and convenient to refer to components of both control systems 10 and 12, only control system 10 will be referred to. It, of course, is to be understood that the operation of control system 12 is identical. Assume initially that rotor 12 of motor 18 is at rest. Reference voltage source 40 would be adjusted to provide an output corresponding to a desired speed from motor 18. Variable speed resistor 26 would be set to provide the same voltage at the desired speed as source 40.

With a zero output from speed sensor 20 there would be applied to differential amplifier 36 only a non-inverting terminal input and thus there would be provided a positive output from differential amplifier 24. This positive output would be applied to the base input of buffer amplifier 46 turning transistor 42 on and transistor 44 off and thus providing a positive output which would cause a current to flow in a forward direction, left to right, through resistor 51 and Hall effect device 50 to ground. Zener diode 62 although being forwardly biased would have no effect because the base of PNP transistor 60 would have a reverse input bias and thus failure sensor switch 58 remains open or inoperative.

The output voltage of Hall effect device 50 is proportional to the current flowing through the device and the magnetic flux from rotor 22 passing through it.

Depending upon the position of rotor 22 and thus the polarity of the sinusoidal magnetic flux acting on Hall effect device 50 there will be provided an appropriate sinusoidal input to differential amplifier 70 to cause it to provide the correct polarity for a desired direction of rotation of motor 18.

When the output voltage of speed sensor 20 is lower than the reference voltage of source 40 comparator 24 will be in a full positive state, causing Hall effect device 50 to be fed constant excitation or input current. The resultant output of Hall effect device 50 is a constant amplitude sinusoid. It will be assumed that the peak value of this sinusoid voltage represents a peak current demand for each of the windings of approximately 10 amps.

The sinusoidal output voltages of Hall effect devices 50 and 50a are applied to resistors 64 and 66 and 64a and 66a of amplifiers 70 and 70a. These voltages are amplified by amplifiers 72 and 72a causing sinusoidal currents to flow in windings 14 and 16. The winding current is sensed by resistors 76, 78 and 76a, 78a and is fed back through resistors 72 and 74 and 72a and 74a where it is subtracted from the voltage applied by the Hall effect devices. Hence, the current feedback forces the winding current to be exactly at the value commanded by the Hall effect device voltage regardless of changes in winding resistance, counter electromotive force, and battery voltage. Thus the current is controlled so that no surge current occurs at initial turn-on or when rotor speed and counter E.M.F. are low. The peak value of the Hall effect device voltages when negatively summed with the feedback voltages in summing circuit 68 and 68a, whose input and feedback resistors are of the proper ratio, will result in peak currents of 10 amps in windings 14 and 16.

As rotor 22 commences to rotate a counter E.M.F. is developed in the windings which tends to reduce winding current to less than 10 amps, and thus create less torque. This reduction in current reduces the voltage across resistors 76 and 76a and 78 and 78a and thus reduces the feedback voltage, causing the net input signal on differential amplifiers 70 and 70a to increase until the desired peak current of 10 amps, and thus the desired torque, are restored. This, of course, occurs almost instantaneously.

In this manner the speed of rotor 22 and its inertial load are increased by the application of a relatively constant torque until the desired speed, as determined by the settings of reference voltage sources 40 and 40a, is reached. As the speed nears the desired speed and thus the output of speed sensors 20 and 20a approach the voltages of reference sources or inputs 40 and 40a comparators 24 and 24a provide smaller output voltages. These in turn cause smaller voltages to be applied by Hall effect devices 50 and 50a to differential amplifiers 70 and 70a and thus cause the pulse width of pulses of pulse-width modulators 80 and 80a to decrease in width to decrease the commanded currents applied to windings 14 and 16. At the desired speed the reference inputs 40 and 40a and the speed feedback inputs to differential amplifiers 36 and 36a will be nearly balanced. The small error signal developed by the difference in these two signals drives the outputs of amplifiers 36 and 36a to magnitudes which will maintain the current in windings 14 and 16 required to overcome the frictional torques being applied by the load. A decrease in speed caused by an increase in load torque is sensed by speed sensors 20 and 20a and causes comparators 24 and 24a to drive harder. Similarly an increase in speed caused by a decrease in load torque will cause comparators 24 and 24a to reduce their outputs. In this fashion rotor 22 is maintained at a constant speed.

As previously observed a purpose of this invention is to enable speed control to be maintained despite the failure of substantial portions of the system. To accomplish this, it was determined that some means must be provided to reduce speed, other than simply by cutting off power, in the event that an excessive demand signal arises in some fashion in the system because of component failure. This was accomplished in the present system by the inclusion of bi-polarity control circuits such as buffer amplifier 46 and 46a and pulse-width modulator 80 and 80a which enable negative and positive speed errors to be corrected by the application of bi-directional torques. Thus for a positive direction of current flow in Hall effect devices 50 and 50a, output signals are provided to apply torque in one direction. With a negative direction of current flow in Hall effect devices 50 and 50a, output signals are provided to provide a storage in the opposite direction.

By then utilizing two such speed controls, one controlling power to one winding and the other controlling power input to the other winding of a D.C. motor, provision is made to compensate for a component failure in either control which tended to produce either an over-speed condition or an under-speed condition.

In creating the capability for correcting overspeed as well as underspeed, it was determined that the sensitivity of the overspeed control signal, negative signal, applied to Hall effect device 50 should be nearly double the sensitivity of the underspeed, positive signal, applied to Hall effect device 50. In other words, if a maximum "slow down" or negative signal is applied to the emitters of transistors 42 and 44, a maximum output voltage, substantially the source voltage, of minus 12 volts appears on the emitters of transistors 42 and 44. If this output were simply permitted to be impressed through only resistor 51 on Hall effect device 50 the decelerating torque provided by winding 14 plus the frictional torque applied by the load would be greater than the accelerating torque that could be provided by winding 16 if there is a maximum positive input signal of 12 volts on the emitters of transistors 42a and 44a. Thus in the event that there occurred a component failure which would create a maximum negative torque in control systems 10 or 12, the friction torque applied by the load would aid the decelerating torque and it would be impossible for the other one, by the application of its maximum positive torque to compensate for this condition and motor 18 would slow down and stop. In order to prevent just this occurrence and at the same time to maintain maximum sensitivity to slow down requirements, resistors 52 and 52a which are equal in value to resistors 51 and 51a, diodes 54 and 54a, and failure sensitive switches 58 and 58a are included.

For example, failure sensitive switch 58 functions to short out the voltage across Hall effect device 50 in the event that buffer amplifier 46a output voltage is negative and exceeds 7 volts, the breakdown voltage of Zener diode 62. Gain setting circuit 48 includes a first current path through resistor 51 to Hall effect device 50 with positive output voltages from buffer amplifier 46 and a second current path of equal impedance through resistor 52 and diode 54 on the appearance of a negative output voltage from buffer amplifier 46. Thus the same magnitude output signal is applied to Hall effect device 50 with a 6 volt negative output of buffer amplifier 46 as for a 12 volt positive output. Thus the circuit has a conductance with respect to negative signals of twice that for positive signals. Hence the amount of decelerating torque for a given negative signal will be twice the accelerating torque for the same magnitude positive signal. In the event that because of circuit failure a negative voltage up to approximately 6 volts should appear at the output of buffer amplifier 46 or 46a of control system 10 or 12, respectively, the resulting slow down would be sensed by the speed transducer of the other control channel and a full positive 12 volt output of the buffer amplifier of that channel would be applied through the appropriate gain setting circuit to the appropriate Hall effect device to increase the forward current in one winding to offset the reverse current in the other winding.

In the event that there is such a component failure that there appears an undesired negative output of one of the buffer amplifiers in excess of 7 volts, the appropriate failure sensitive switch is activated by Zener diode 62 and current limiting resistor 61 and shunts out the current to the Hall effect device across which it is connected and the other control channel senses the resulting slow down and increases current to the winding to which that control channel is connected to maintain speed. Thus, except for a small range of approximately −6 to −7 volt outputs from a buffer amplifier, the system will correct for other possible abnormal voltages and maintain proper speed.

Similarly, if a component failed in such a manner as to cause either a partial or full acceleration torque to be applied by one of the channels, the increase in speed would be sensed by the speed sensor in the good channel. Since the feedback signal is now greater than the reference signal 40, the output of comparator 24 reverses its output and causes negative current to flow in Hall effect device 50 and a negative or decelerating compensating torque to be applied. Since the torque gain in the deceleration mode is twice that for acceleration and since friction aids in the deceleration mode the output of buffer amplifier 46 never has to go greater than 6 volts negative to compensate for hard over failures in the positive direction. Hence hard over failures or failures greater than 6 volts in the negative direction can be sensed by Zener diode 62 and the effect of the failure eliminated by failure sense switch 60.

From the foregoing it will be appreciated that this invention provides an improved system for the control of speeds of Hall effect device equipped motors enabling a degree of certainty and reliability of speed control not previously available.

What is claimed is:

1. A motor control system for a Hall effect commutating motor having first and second stationary windings, a permanent magnet rotor, and first and second Hall effect devices responsive to said rotor for controlling current flow to said windings, comprising:

first and second speed signal generating means, each comprising means responsive to the rotation of said rotor for generating a signal of a magnitude proportional to the speed of said motor;

first and second comparator means, each comprising means responsive to the output of a discrete said speed generating means for generating an output of a first polarity upon receiving a said signal of smaller value than a selected reference value and of an opposite, or second, polarity when said signal is of greater value than said selected reference value;

first and second failure sensitive coupling means, each interconnecting the output of a discrete said comparator means to a control input of a discrete said Hall effect device and comprising means responsive to a preselected said value of said last named output for reducing its level to substantially zero;

first and second power supplies, said first power supply being responsive to a control output of said first Hall effect device for powering said first winding and said second power supply being responsive to a control output of said second Hall effect device for powering said second winding;

whereby, said first speed signal generating means, said first failure sensitive coupling means, said first Hall effect device and said first power supply comprise a first control channel, and said second speed signal generating means, said second comparator means, said second failure sensitive coupling means, said second Hall effect device and said second power supply comprise a second control channel and in the event of a failure of one of said control channels to provide an output as indicated by a properly functioning said speed signal generating means, said other control channel will provide a corrective output to correct the speed of said rotor.

2. A motor control system as set forth in Claim 1 wherein a said failure sensitive coupling means comprises:
- a transistor switch connected across the control input of said Hall effect device; and
- voltage sensitive means responsive to said preselected value of said output from said comparator means for "triggering on" said transistor switch and substantially shorting the control input to said Hall effect device.

3. A motor control system as set forth in Claim 2 further comprising a gain setting circuit interconnecting each said comparator means to each said Hall effect device and comprising first and second impedance paths connected in parallel and wherein one of said impedance paths includes a rectifier whereby current flow between a said comparator means and said Hall effect device in one direction is substantially greater than current flow in the opposite direction.

4. A motor control system as set forth in Claim 3 wherein said impedance paths have a conductance to enable substantially identical current flow with an applied one half voltage of a said second, or "decrease speed" polarity compared with a first or "increase speed" polarity signal for "triggering on" said transistor switch.

5. A motor control system as set forth in Claim 2 further comprising a buffer circuit interconnecting each of said comparators to a said gain setting circuit, a said failure sensitive means and a said Hall effect device comprising an amplifier including a pair of complementary transistors, the base input terminals of which are connected together and the emitter output terminals of which are connected together.

6. A motor control system as set forth in Claim 5 wherein:
- each said speed signal generating means is an alternating current generator; and
- the system further comprises an input circuit interconnecting said speed signal generating means of a said comparator means comprises an adjustable resistor, a rectifier, and a smoothing filter;
- whereby a selectively attenuated direct current is provided as said input signal to a said comparator means.

* * * * *